United States Patent

[11] 3,564,202

[72] Inventor Gerd M. Oppenheim
  P.O. Box 6091, San Francisco, Calif. 94101
[21] Appl. No. 814,028
[22] Filed Apr. 7, 1969
[45] Patented Feb. 16, 1971

[54] SPECTACLE FRAME HEATING APPARATUS
  10 Claims, 5 Drawing Figs.
[52] U.S. Cl. .................................................. 219/400;
  49/390; 99/398; 219/390; 219/521; 312/295;
  312/302; 351/41
[51] Int. Cl. .................................................. F27d 11/02
[50] Field of Search .................................. 219/260,
  385, 389, 388, 390—92, 400, 411, 521, 19.15;
  110/8—9, 13—4; 99/334—5, 377, 398; 264/249;
  351/95, 158, 178; 312/295, 311, 323, 305,
  302—3; 49/390, 169; 13/20, 22, 25

[56] References Cited
  UNITED STATES PATENTS
2,811,754 11/1957 Toth ................................. 49/390X

| | | | |
|---|---|---|---|
| 2,938,247 | 5/1960 | Hagerty | 49/390 |
| 1,724,217 | 8/1929 | Nelson | 99/398 |
| 1,987,703 | 1/1935 | O'Neill | 99/335 |
| 2,129,360 | 9/1938 | Purpura | 99/335 |
| 2,836,696 | 5/1958 | Ratchford | 219/390 |
| 2,864,932 | 12/1958 | Forrer | 219/521X |
| 3,142,748 | 7/1964 | Warren | 219/392 |
| 3,313,917 | 4/1967 | Ditzler et al. | 219/400 |

Primary Examiner—Volodymyr Y. Mayewsky
Attorney—Gardner & Zimmerman

ABSTRACT: An apparatus for heating plastic spectacle frames to permit the insertion of lenses into the openings provided therefor. The apparatus includes a thermally insulated heating compartment, with a frame supporting element movable to selectively place the frame in the compartment and remove it therefrom. Controls are provided for controlling the heat and exposure period, such controls providing for selective manual or automatic cycling of sequential frames into and out of the heating compartment.

INVENTOR
GERD M. OPPENHEIM

BY

ATTORNEYS

PATENTED FEB 16 1971

INVENTOR
GERD M. OPPENHEIM

BY *Gardner & Zimmerman*

ATTORNEYS

SPECTACLE FRAME HEATING APPARATUS

BACKGROUND OF THE DISCLOSURE

In the construction of spectacles utilizing a cellulose, acetate or other plastic frame, it is common procedure to first heat the frame, and while the latter is still in a heated and consequently expanded condition, to insert the lenses thereinto. Upon cooling of the frame, there is a resulting contraction about the lenses which then secures the latter in the frame.

One of the commonly used systems for effecting the heating operation comprises the insertion of a frame into a basket or pot of heated salt. The drawbacks of such a process are believed too obvious to warrant further discussion. Other systems using some form of oven have been contemplated, but such systems have not been commercially satisfactory for a number of reasons, including lack of proper and adequate control over the heating temperature and dwell period in the oven, inability to effect rapid changes of temperature lack of automatic cycling capabilities, etc.

The primary object of the present invention is to overcome the foregoing difficulties of the prior art and provide a simple mechanism which can be utilized to heat frames to a predetermined and preselected temperature for a selective period of time and then discharge the frame automatically so that the operator may promptly install the lenses therein.

Additionally, the apparatus is so constructed that it is possible to change the temperature in the heating compartment thereof in a fast and efficient manner.

Further, the apparatus can be set for completely automatic operation so that the only acts required of the operator are to lead the fresh frames and remove the heated frames, both steps taking place exteriorly of the heating compartment.

THE DRAWINGS

DESCRIPTION OF THE PREFERRED EMBODIMENT

Figure 1:
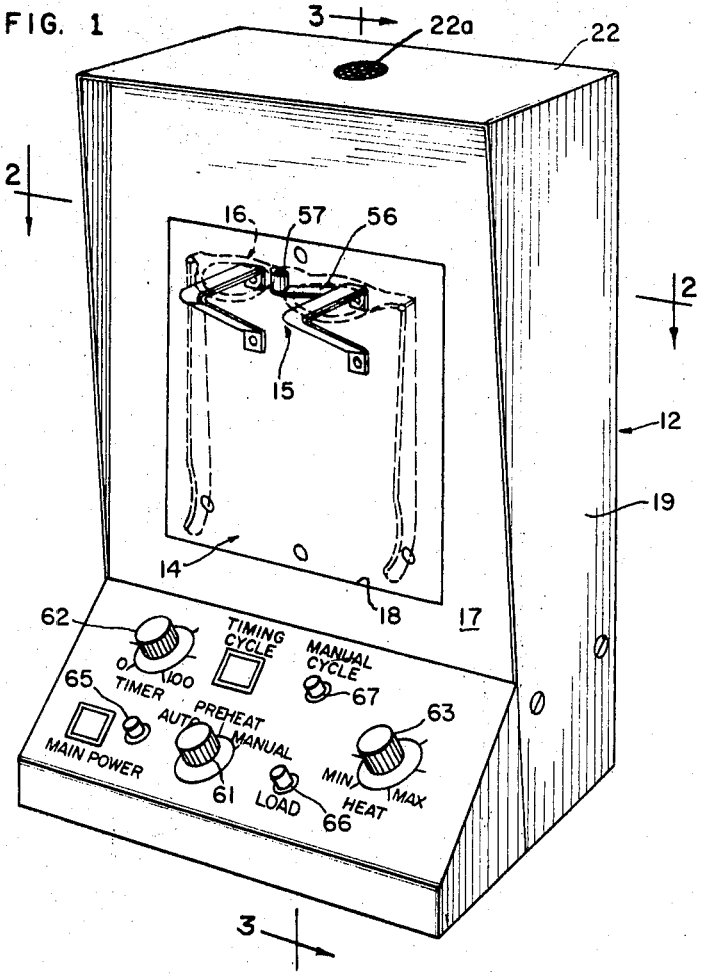
FIG. 1 is a front perspective view of the apparatus of the present invention.

In broad terms, the apparatus of this invention includes a housing 12 defining a heating chamber 13, with access to the chamber being provided by a door 14. As will be more clearly discussed hereinafter, each surface of the door is provided with a supporting means 15 to engage a spectacle frame 16, whereby as one frame is being loaded on the outer surface of the door, the other surface is disposed within the heating compartment or chamber to heat the frame supported thereon.

As here illustrated, the housing 12 includes a front wall 17 having an opening 18 therein which is normally closed by the door 14. The housing further includes sidewalls 19, a backwall 21, a top wall 22 and a bottom 23. It is important to note the chamber 13 is not bounded by the housing portions just described, but rather by a liner, generally designated at 26, which includes a front wall 27, having an opening 28, corresponding to opening 18, sidewalls 29, a backwall 31, a top wall 32, and a bottom 33. Each of the liner walls is spaced from its corresponding wall of the housing to provide an air space or passageway 34 completely surrounding compartment 13. Disposed in an enlarged portion 36 of such space intermediate walls 23 and 33 is a blower 37 driven by a motor 38. The blower is utilized to circulate air through the space 34, the latter being provided with a vent 22a in wall 22, so that an effective insulation is provided between the chamber and the ambient air exteriorly of the housing. With this arrangement, in place of a more conventional thermal shield such as asbestos, it is possible to decrease the temperature in the chamber in a minumum of time, since the excess heat will be rapidly dissipated by the moving air in space 34.

Figure 3:
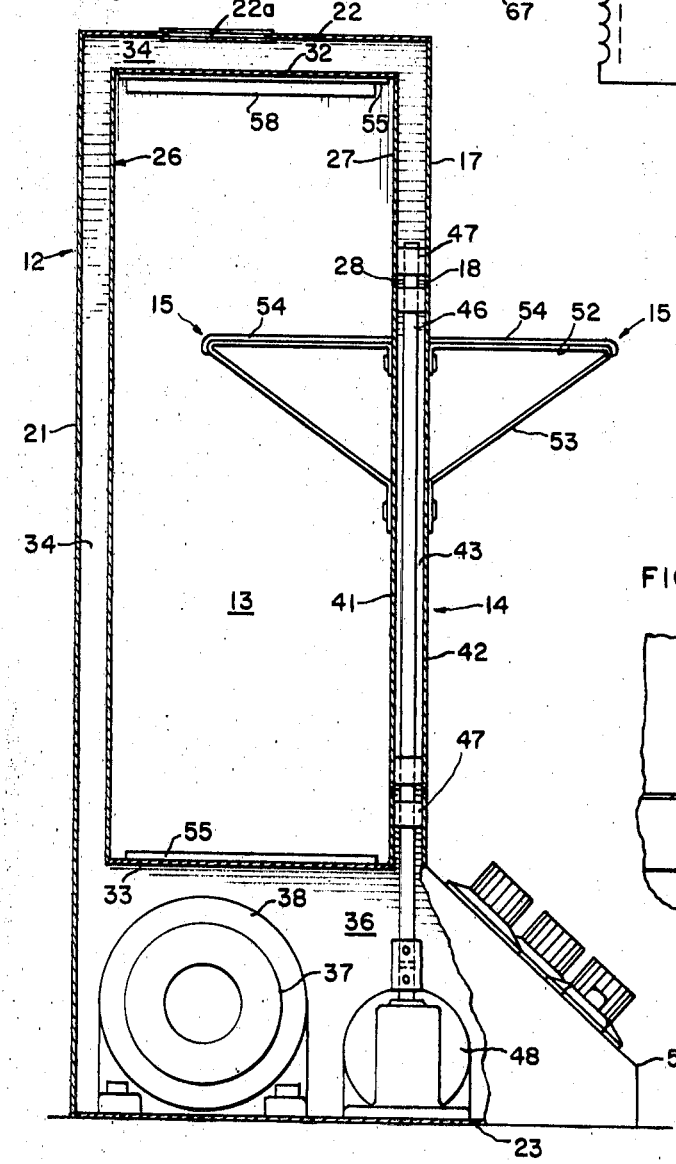
FIG. 3 is a vertical sectional view taken in the plane indicated by line 3—3 of FIG. 1.
Figure 4:
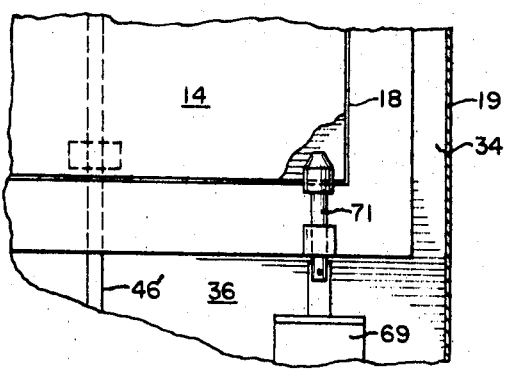
FIG. 4 is a sectional view taken in the plane indicated by line 4—4 of FIG. 2.

In the same manner, the door 14 is formed as spaced-apart walls 41 and 42 with an air space 43 therebetween so that when the door is in its chamber closing position as illustrated in FIGS. 1 and 3, the space will be in alignment and in airflow communication with the passageway 34.

Figure 2:
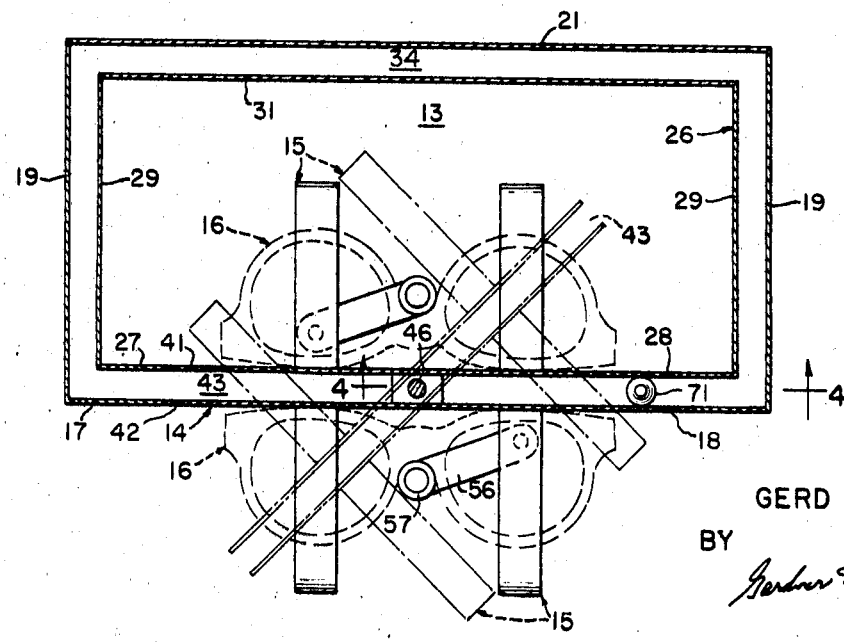
FIG. 2 is a horizontal sectional view taken in the plane indicated by line 2—2 of FIG. 1.

The door is pivotable about a central post 46 extending generally centrally of the door width, the post being connected to door brackets 47 at its upper end, and operatively connected by a belt drive (not shown) to a motor 48 at its lower end. As will be appreciated, actuation of the motor will result in a rotation of the post and the door supported thereby, causing the latter to move through the intermediate position illustrated in dash-dot lines in FIG. 2, until the walls 41 and 42 thereof have reversed themselves. Thus, the frame supporting means 15, previously positioned within the heating compartment, will be disposed exteriorly of the housing permitting removal of a heated frame. Conversely, the previously exposed means 15 will now be disposed within the chamber for heating of a frame supported thereon.

The frame supporting means 15 are here illustrated as including a pair of brackets, each having a narrow plate 52 extending horizontally outwardly from the door adjacent the upper edge thereof, and a connecting plate 53. The upper surface of plate 52 may be covered with a layer 54 of Teflon, woven glass or similar material to prevent burning and adherence of the frame on the metal plates. The nose piece of the frame is preferably independently supported by an arm 56 pivotally mounted for horizontal swinging movement, and having a vertical extension at is its distal end, provided with a roller 57. The roller is intended to engage the nose piece, and thus insure retention of he the frame on the supporting brackets during door movement.

Figure 5:
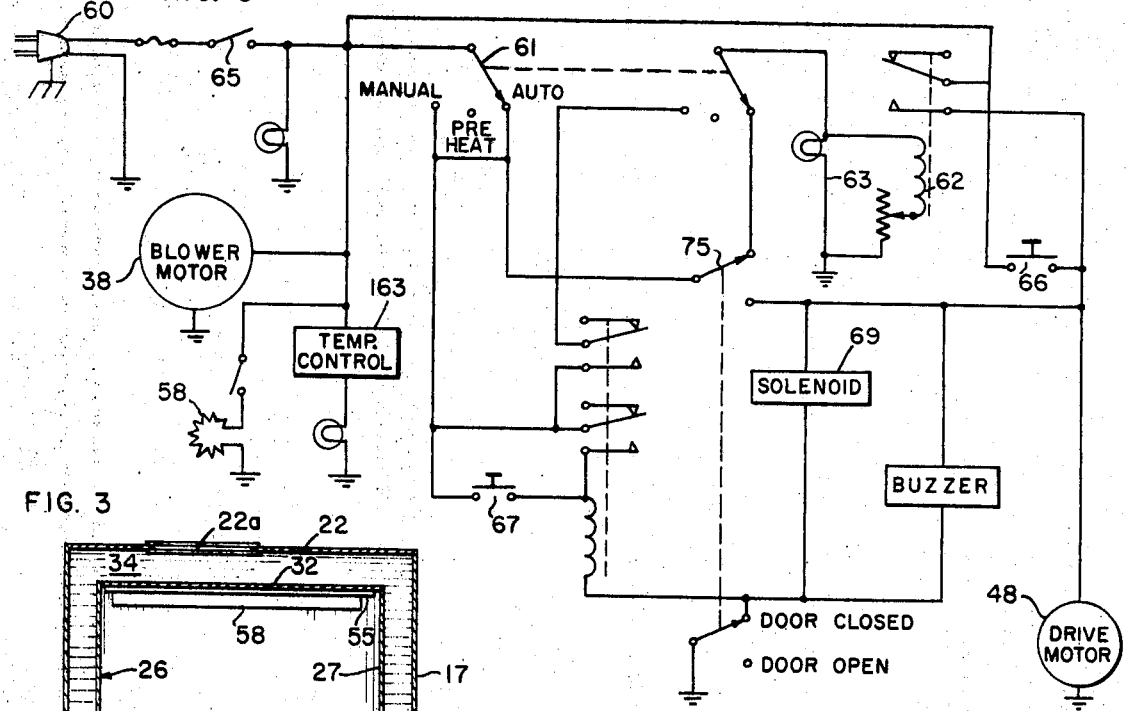
FIG. 5 is a diagrammatic view of the wiring diagram.

Disposed within the chamber 13 is a heater 58, and positioned within the enlarged space portion 36 and in a forward extension 59 of the housing are the necessary electrical units, diagrammatically illustrated in FIG. 5 of the drawings, and controlled by manually engageable knobs or dials positioned on the exterior surface of the extension. The heater 58 preferably constitutes a quartz light, since such a heater is capable of fast cooling and heating, and suitable reflectors 55 are provided within the chamber on the top and bottom walls thereof. Such units, their control and function may best be explained in connection with the operation of the apparatus.

Assuming that a manual operation is desired, i.e. only a single cycle of door movement, with the plug 60 connected to a suitable power source, the main power switch 65 is actuated, and a control switch 61 is moved to the "manual" setting. A convention adjustable time delay relay 62 is set for the desired period of time that the spectacle frame is to remain in the chamber 13, and the heater temperature control 63 is set for the desired temperature. This temperature may be in the general range of from about 150° F. to 400° F., depending upon the particular material and thickness of the frame.

The frame may then be placed upon the supporting brackets and the load switch 66 momentarily engaged; this in turn engages the solenoid 69 which removes pin 71 from between the door walls and also starts drive motor 48. As the door begins to move, microswitch 72 engages, removing power from the solenoid 69 and applying power to the drive motor 48 and overriding load switch 66, and will effect a 180° rotation of the door 14. As the door nears the closed position, microswitch 72 disengages, removing power from the drive motor.

At this time the frame is now in the chamber, so the manual cycle switch 67 is momentarily depressed. This engages and locks relay 73, which in turn applies power to the time delay relay 62, starting the timing sequence. Upon termination of the time period, time delay relay 62 energizes starting drive motor 48, which engages microswitch 72. When the microswitch engages, relay 73 is deenergized, which in turn disengages time delay relay 62 and allows door 14 to make a 180° rotation, placing the frame on the outside of the chamber.

In many cases, it is preferable to have a completely automatic cycling, so that after the time and temperature settings have been determined, it is only necessary for the operator to load new frames and remove heated frames form the machine. For this operation, switch 61 is set on "automatic" with the main power switch 65 on, and with time and temperature control set accordingly.

It should also be pointed out that with the control arrangement illustrated, even after a frame is disposed within the heating chamber, both the time sequence and the heating temperature may be altered. This is an important feature since such changes may be dictated upon inspection of a previously removed heated frame from the apparatus.

No further detailed explanation of the wiring diagram is believed necessary, and while other features, such as lights and buzzers are illustrated, they form no independent part of this invention and accordingly have not been described.

From the foregoing, it is believed clear that the apparatus of the present invention, while extremely compact and simple, is capable of performing its requisite functions in an efficient and reliable manner.

I claim:

1. An apparatus for heating spectacle frames comprising a housing, a thermally insulated heating chamber enclosed by said housing and having an access opening in the wall of said housing, closing means normally closing said access opening, electrical heating means in said chamber for heating the interior thereof a spectacle frame supporting element mounted on said closing means, and electrically actuated means for moving said closing means between a first position wherein said element is positioned exteriorly of said chamber and a second position wherein said element is positioned within said chamber, said element being movable only in a horizontal plane whereby a spectacle frame will remain thereon during movement of said closing means.

2. The apparatus as set forth in claim 1 in which said housing having double-wall structure defining an air space therebetween.

3. The apparatus as set forth in claim 2 including blower means for circulating air in said air space to cool said chamber upon deenergization of said heating means.

4. The apparatus as set forth in claim 1 in which said closing means comprises a door pivotally mounted about a vertical axis within said opening whereby opposed surfaces of said door may be disposed within said chamber, said frame supporting element being provided on each of said door surfaces.

5. The apparatus as set forth in claim 4 in which said frame supporting element includes a pair of horizontally disposed strips for engaging and supporting the frame eye pieces and a pivotally movable frame nose engaging member for retaining a frame on said strips.

6. The apparatus as set forth in claim 1 in which said electrically actuated means for moving said closing means is automatically activated upon the expiration of a preselected period of time.

7. The apparatus as set forth in claim 6 including locking means for normally locking said closing means in closed relationship to said access opening and releasing means for releasing said locking means upon actuation of said electrically actuating means for moving the closing means to an open position.

8. The apparatus as set forth in claim 2 in which said closing means comprises a double-wall door having an air space therebetween in flow communication with said first air space when said door is in closed position, said door having a vertically disposed central pivot element, drive means for rotating said door through 180° of movement, timer means, and actuating means for automatically actuating said drive means upon expiration of a preselected period of said time means.

9. The apparatus as set forth in claim 8 in which said drive means continuously cycle and rotate said door at the end of each time period.

10. Apparatus as set forth in claim 9 in which blower means are provided for circulating air through each of said spaces.